(12) United States Patent
Matsumura et al.

(10) Patent No.: US 7,743,880 B2
(45) Date of Patent: Jun. 29, 2010

(54) SOUND ABSORBING STRUCTURE

(75) Inventors: Toshiyuki Matsumura, Osaka (JP); Shuji Saiki, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/885,500

(22) PCT Filed: Mar. 30, 2006

(86) PCT No.: PCT/JP2006/306716

§ 371 (c)(1), (2), (4) Date: Aug. 31, 2007

(87) PCT Pub. No.: WO2006/106854

PCT Pub. Date: Oct. 12, 2006

(65) Prior Publication Data
US 2008/0135327 A1 Jun. 12, 2008

(30) Foreign Application Priority Data
Mar. 30, 2005 (JP) ............................. 2005-097403

(51) Int. Cl.
A47B 81/06 (2006.01)
(52) U.S. Cl. ................ 181/198; 181/151; 181/284; 181/294
(58) Field of Classification Search ............... 181/198, 181/151, 294, 284, 298, 149
See application file for complete search history.

(56) References Cited
U.S. PATENT DOCUMENTS

| 2,028,272 | A | * | 1/1936 | Burgess | 52/145 |
| 4,101,736 | A | * | 7/1978 | Czerwinski | 381/332 |
| 4,340,129 | A | * | 7/1982 | Salyers | 181/200 |
| 4,356,882 | A | * | 11/1982 | Allen | 181/151 |
| 4,531,609 | A | * | 7/1985 | Wolf et al. | 181/290 |
| 4,657,108 | A | * | 4/1987 | Ward | 181/151 |
| 4,975,966 | A | * | 12/1990 | Sapiejewski | 381/189 |

(Continued)

FOREIGN PATENT DOCUMENTS

JP 5-232967 9/1993

(Continued)

OTHER PUBLICATIONS

Machine translation of JP2005-163377.*

(Continued)

Primary Examiner—Jeffrey Donels
Assistant Examiner—Forrest M Phillips
(74) Attorney, Agent, or Firm—Wenderoth, Lind & Ponack, L.L.P.

(57) ABSTRACT

A sound absorbing structure includes a housing having a front face, and a side face which is provided perpendicularly around at least a part of an edge portion of the front face; a gas adsorption material for physically adsorbing gas in an interior space delimited by the front face and the side face of the housing, which gas adsorption material is placed in the interior space; sealing element for sealing the gas adsorption material from outside thereof; and an acoustic connection section for functioning as an acoustic mass so as to acoustically connect an exterior space and the interior space of the housing, which acoustic connection section is provided in at least one of the front face and the side face.

11 Claims, 13 Drawing Sheets

U.S. PATENT DOCUMENTS

| | | | | |
|---|---|---|---|---|
| 5,457,291 | A * | 10/1995 | Richardson | 181/293 |
| 5,484,970 | A * | 1/1996 | Suzuki et al. | 181/294 |
| 5,589,242 | A * | 12/1996 | Stief et al. | 428/45 |
| 6,598,701 | B1 * | 7/2003 | Wood et al. | 181/290 |
| 6,617,002 | B2 * | 9/2003 | Wood | 428/131 |
| 7,364,014 | B2 * | 4/2008 | Goda et al. | 181/293 |
| 2002/0040827 | A1 * | 4/2002 | Kraft et al. | 181/293 |
| 2003/0006091 | A1 * | 1/2003 | Golterman | 181/292 |
| 2003/0024670 | A1 * | 2/2003 | Andersson et al. | 162/179 |
| 2004/0102752 | A1 * | 5/2004 | Chen et al. | 604/378 |
| 2004/0107474 | A1 * | 6/2004 | Sesselmann | 2/69 |
| 2004/0116018 | A1 * | 6/2004 | Fenwick et al. | 442/164 |
| 2004/0182240 | A1 * | 9/2004 | Bause et al. | 95/146 |
| 2004/0251077 | A1 * | 12/2004 | Wright et al. | 181/151 |
| 2005/0098379 | A1 * | 5/2005 | Sato et al. | 181/293 |
| 2005/0109557 | A1 * | 5/2005 | Dravet et al. | 181/292 |
| 2005/0157890 | A1 * | 7/2005 | Nakajima et al. | 381/92 |
| 2005/0167193 | A1 * | 8/2005 | Van Reeth | 181/293 |
| 2007/0186493 | A1 * | 8/2007 | Baig | 52/144 |
| 2007/0223714 | A1 * | 9/2007 | Nishikawa | 381/71.1 |
| 2007/0227814 | A1 * | 10/2007 | Schabel, Jr. | 181/288 |
| 2007/0227815 | A1 * | 10/2007 | Nakamura | 181/290 |
| 2008/0078611 | A1 * | 4/2008 | Inoue et al. | 181/206 |
| 2008/0135327 | A1 * | 6/2008 | Matsumura et al. | 181/151 |

FOREIGN PATENT DOCUMENTS

| | | |
|---|---|---|
| JP | 06202668 A * | 7/1994 |
| JP | 10-227085 | 8/1998 |
| JP | 11-350656 | 12/1999 |
| JP | 2000-192429 | 7/2000 |
| JP | 2000-273829 | 10/2000 |
| JP | 2004-537938 | 12/2004 |
| JP | 2005-163377 | 6/2005 |
| WO | 03/013183 | 2/2003 |

OTHER PUBLICATIONS

Machien translation of JP05-232967.*

* cited by examiner

F I G. 1 5
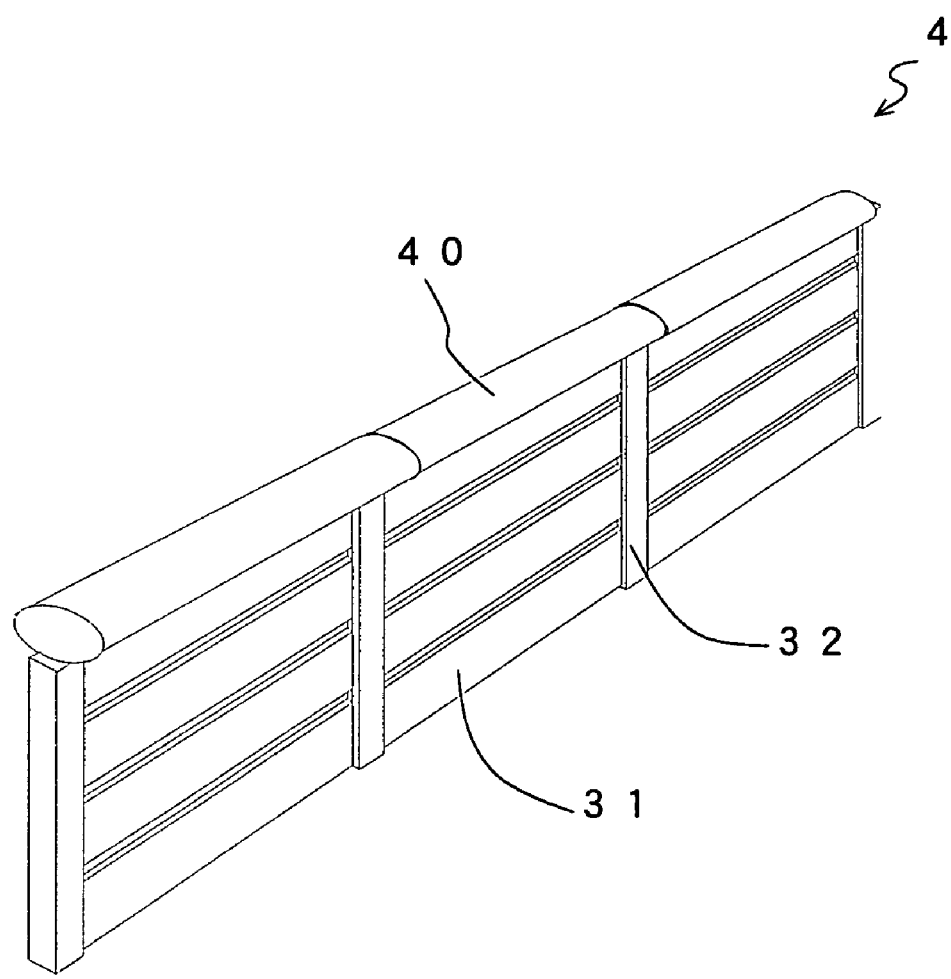

SOUND ABSORBING STRUCTURE

BACKGROUND OF THE INVENTION

TECHNICAL FIELD

The present invention relates to a sound absorbing structure, and more specifically to a sound absorbing structure for absorbing a noise.

BACKGROUND ART

In recent years, people's awareness of their living environment has been raised, and also it has been increasingly necessary to sufficiently consider an acoustic environment, e.g., noises coming from outside, or the like. In such a circumstance, a noise control technology is particularly important. As the most common noise control technology, a sound absorbing structure 100 using a Helmholtz resonance effect as shown in FIG. 17 has been known (for example, see patent document 1). FIG. 17 is a cross-sectional view showing a structure of the conventional sound absorbing structure 100. The sound absorbing structure 100 comprises an acoustic port 101 and a cabinet 102. In a front surface of the cabinet 102, an opening is formed and the acoustic port 101 is fixed. Here, a volume of an inside of the cabinet 102 is V0; an acoustic velocity is c; a radius of the opening of the acoustic port 101 (or effective radius) is r; a length of the opening of the acoustic port 101 is l0; and an air density is ρ. Then, an air stiffness component S0 of the volume V0 is represented by the equation below.

[equation 1]
$$S_0 = \frac{\rho c^2 \pi^2 r_0^4}{V_0} \quad (1)$$

Also, a mass of air, m0, of the acoustic port 101 is represented by the equation below.

[equation 2]
$$m_0 = \rho \pi r_0^2 (l_0 + r_0) \quad (2)$$

Due to the air stiffness component S0 and the mass of air m0, the Helmholtz resonance occurs. A frequency f0 at which the resonance occurs (hereinafter, referred to as a resonance frequency) is represented by the following equation based on the above equations (1) and (2).

[equation 3]
$$f_0 = \frac{1}{2\pi}\sqrt{\frac{S_0}{m_0}} = \frac{c}{2\pi}\sqrt{\frac{\pi r_0^2}{V_0(l_0 + r_0)}} \quad (3)$$

In a band which includes the resonance frequency f0 and frequencies near the resonance frequency f0, influx and efflux of air at the opening of the acoustic port 101 is intensified. Then, due to friction between air and the sound absorbing structure 100, a sound in the band, which includes the resonance frequency f0 and frequencies near the resonance frequency f0, is absorbed.

Also, as another example using the Helmholtz resonance effect, a sound absorbing structure 110 shown in FIG. 18 has been known (for example, see patent document 2). FIG. 18 shows a front view of the conventional sound absorbing structure 110 and a cross-sectional view of the conventional sound absorbing structure 110 taken along a line AA. The sound absorbing structure 110 comprises a front board 111, side boards 112 and a back board 113. The front board 111 is a plywood plate, a hard fiberboard plate or a metal plate. A plurality of openings 111h are formed in the front board 111. A shape of each opening 111h is, for example, round or slit-shaped. When the opening 111h are formed uniformly in the front board 111 and all the openings have the same shape, a resonance frequency f0 is determined by both a mass of air of an opening and air stiffness of a volume obtained by dividing a volume of an inside of the sound absorbing structure 110 by the number of the openings. This resonance frequency f0 is represented by the equation below. Here, an effective radius of each opening 111h is d0; a length of each opening 111h is t0; a distance from the front board 111 to the back board 113 is L0; and a spacing between the openings 111h is D0.

[equation 4]
$$f_0 = \frac{c}{2\pi}\sqrt{\frac{P}{(t_0 + d_0)L_0}} \quad \text{here, } P = \frac{\pi d_0^2}{D_0^2} \quad (4)$$

In a band which includes the resonance frequency f0 and frequencies near the resonance frequency f0, a sound is absorbed in the same manner as that of the above-described sound absorbing structure 100.

(Patent Document 1) Japanese Laid-Open Patent Publication No. 5-232967

(Patent Document 2) Japanese Laid-Open Patent Publication No. 11-350656

SUMMARY OF THE INVENTION

In order to obtain a sound absorption effect in a low-pitched range, the resonance frequency f0 is required to be lowered so as to be within a desired low-pitched range. As mentioned above, the resonance frequency f0 is determined by the mass of air m0 and the air stiffness component S0. Therefore, in order to lower the resonance frequency, the mass of air m0 is required to be increased and the air stiffness component S0 is required to be reduced. In order to reduce the air stiffness component S0, the sound absorbing structure 100 shown in FIG. 17 is required to be increased in the volume V0 while the sound absorbing structure 110 shown in FIG. 18 is required to be increased in the distance L0 from the front board 111 to the back board 113. In other words, the sound absorbing structure 100 shown in FIG. 17 is required to be increased in size. On the other hand, the sound absorbing structure 110 shown in FIG. 18 is required to be increased in thickness.

As described above, there has been a problem that in order to lower the resonance frequency f0, the size of the sound absorbing structure is required to be increased or the thickness of the sound absorbing structure is required to be increased. Also, in the case where the sound absorbing structure is installed on a wall of a house, for example, indoor space becomes limited due to the increased size of the sound absorbing structure. Thus, it has conventionally been difficult for a sound absorbing structure to absorb a sound in a low-pitched range while remaining compact in size.

Therefore, an object of the present invention is to provide a sound absorbing structure which is capable of absorbing a sound in a low-pitched range while remaining compact in size.

A first aspect of the present invention is directed to a sound absorbing structure comprising: a housing including a front face, and a side face provided perpendicularly around at least a part of an edge portion of the front face; a gas adsorption material placed in an interior space of the housing, which interior space is delimited by the front face and the side face, the gas adsorption material physically adsorbing gas in the interior space; sealing means for sealing the gas adsorption material from outside thereof; and an acoustic connection section provided in at least one of the front face and the side face, which acoustic connection section functions as an acoustic mass for acoustically connecting the interior space of the housing and an exterior space of the housing.

In a second aspect of the present invention based on the above first aspect, the gas adsorption material is either one of activated carbon and zeolite.

In a third aspect of the present invention based on the above first aspect, the gas adsorption material is at least one selected from the group consisting of granular activated carbon, fibrous activated carbon, felt activated carbon and nonwoven-fabric activated carbon.

In a fourth aspect of the present invention based on the above first aspect, a plurality of the acoustic connection sections are provided in at least one of the front face and the side face, and the plurality of the acoustic connection sections function as different acoustic masses from each other.

In a fifth aspect of the present invention based on the above first aspect, the housing includes the side face provided perpendicularly around an entire edge portion of the front face, and the interior space of the housing is open at a back side of the housing.

In a sixth aspect of the present invention based on the above first aspect, the sealing means is a pouch-shaped body in which the gas adsorption material is placed.

In a seventh aspect of the present invention based on the above sixth aspect, the pouch-shaped body is produced from a material containing one selected from the group consisting of silicon dioxide, aluminum and alumina.

In an eighth aspect of the present invention based on the above first aspect, the acoustic connection section is realized by an opening formed in at least one of the front face and the side face.

In a ninth aspect of the present invention based on the above first aspect, the acoustic connection section is structured by an acoustic port provided at an opening formed in at least one of the front face and the side face.

In a tenth aspect of the present invention based on the above first aspect, the housing includes the side face provided perpendicularly around the entire edge portion of the front face, and a back face facing the front face and having an edge portion thereof joined to an edge portion of the side face. The interior space of the housing is formed by being surrounded by the front face, the side face, and the back face.

In an eleventh aspect of the present invention based on the above tenth aspect, the acoustic connection section is realized by an opening formed in at least one of the front face and the side face. The sealing means is structured by a filmy shielding element for shielding gas by having an entire edge portion thereof attached to an inner surface of the side face, the back face, and the side face. The gas adsorption material is placed in a space surrounded by the shielding element, the back face, and the side face.

In a twelfth aspect of the present invention based on the above eleventh aspect, the shielding element is produced from a material containing one selected from the group consisting of silicon dioxide, aluminum and alumina.

In a thirteenth aspect of the present invention based on the above tenth aspect, the acoustic connection section is provided at such a location as to cover an opening formed in at least one of the front face and the side face, and is structured by a filmy shielding element for shielding gas. The sealing means is structured by the shielding element, the front face, the side face, and the back face. The gas adsorption material is placed in a space surrounded by the shielding element, the front face, the side face, and the back face.

In a fourteenth aspect of the present invention based on the above tenth aspect, an opening is formed in at least one of the front face and the side face. The acoustic connection section is structured by a diaphragm, and a supporting element having an inner perimeter portion thereof fixed to an outer perimeter portion of the diaphragm and having an outer perimeter portion thereof fixed to the opening, which supporting element supports the diaphragm in such a manner as to allow the diaphragm to vibrate. The sealing means is structured by the diaphragm, the supporting element, the front face, the side face, and the back face. The gas adsorption material is placed in a space surrounded by the diaphragm, the supporting element, the front face, the side face, and the back face.

In a fifteenth aspect of the present invention based on the above tenth aspect, the sound absorbing structure further comprises a plurality of partition plates for partitioning the interior space of the housing into a plurality of spaces facing the front face. In the sound absorbing structure, the acoustic connection section is structured by an opening formed in the front face so as to allow at least one of the plurality of spaces to be open to an exterior space at a side of the front face, and the side face and the partition plates for forming the at least one of the plurality of spaces open to the exterior space at the side of the front face. The sealing means is structured by a part of the front face for separating the exterior space at the side of the front face, the partition plates, and a shielding element for shielding gas by having an entire edge portion thereof attached to inner surfaces of the partition plates and an inner surface of the side face. The gas adsorption material is placed in a space delimited by a part of the front face, the partition plates, and the shielding element.

In a sixteenth aspect of the present invention based on the above fifteenth aspect, the shielding element is produced from a material containing one selected from the group consisting of silicon dioxide, aluminum and alumina.

In a seventeenth aspect of the present invention based on the above first aspect, the sound absorbing structure further comprises a sound absorbing element for absorbing a sound propagated from the exterior space of the housing, which sound absorbing element is placed inside of the housing or on an outer surface of the housing.

In an eighteenth aspect of the present invention based on the above seventeenth aspect, the sound absorbing element is at least one selected from the group consisting of glass wool, rock wool, slag wool, felt, resin foam and porous cast iron.

In a nineteenth aspect of the present invention based on the above first aspect, the sound absorbing structure further comprises: a microphone for detecting a sound propagated from the exterior space of the housing; a sound generation circuit for generating a sound signal having an opposite phase to that of the sound detected by the microphone; and a speaker for outputting a sound to the exterior space of the housing, which sound is based on the sound signal generated by the sound generation circuit.

According to the first aspect described above, a Helmholtz resonance occurs owing to the interior space of the housing and the acoustic connection section, and a sound from the exterior space of the housing is absorbed in a band which includes a resonance frequency and frequencies near the resonance frequency. Also, according to the first aspect, due to a physical adsorption effect of the gas adsorption material, a volume of the interior space of the housing is equivalently expanded. This enables a resonance frequency to be set to a lowered frequency without increasing a size of the sound absorbing structure. In other words, without increasing the size of the sound absorbing structure, sound absorption can be performed in a low frequency band. Also, in the case where sound absorption is performed in a conventionally used frequency band, the sound absorbing structure can be decreased in size as compared with the sound absorbing structure of a conventional art. Also, according to the first aspect, since the gas adsorption material is sealed by the sealing means, the physical adsorption effect of the gas adsorption material is maintained for a long period whatever the environment in which the sound absorbing structure is installed.

According to the second aspect described above, a high physical adsorption effect is obtained and a resonance frequency can be set increasingly low.

According to the third aspect described above, a high physical adsorption effect is obtained efficiently.

According to the fourth aspect described above, the plurality of the acoustic connection sections function as different acoustic masses from each other such that sound absorption can be performed in a plurality of bands, each of which includes a resonance frequency and frequencies near the resonance frequency.

According to the fifth aspect described above, in the case where the sound absorbing structure is installed, for example, on a wall of a house, the interior space of the housing is formed by using the wall. This reduces the number of components of the sound absorbing structure.

According to the sixth aspect described above, since the gas adsorption material is placed inside of the pouch-shaped body, the sealing means is able to seal the gas adsorption material.

According to the seventh aspect described above, moisture exclusion capability of the pouch-shaped body is enhanced and a physical adsorption effect of the gas adsorption material is maintained for a longer period.

According to the eighth aspect described above, a Helmholtz resonance occurs owing to the opening and the interior space of the housing, and a sound from the exterior space of the housing is absorbed in a band which includes a resonance frequency and frequencies near the resonance frequency.

According to the ninth aspect described above, a Helmholtz resonance occurs owing to the acoustic port and the interior space of the housing, and a sound from the exterior space of the housing is absorbed in a band which includes a resonance frequency and frequencies near the resonance frequency.

According to the tenth aspect described above, an installation location of the sound absorbing structure is freely selected.

According to the eleventh aspect described above, owing to the filmy shielding element, a sound propagated from the exterior space of the housing is transmitted to the gas adsorption material efficiently.

According to the twelfth aspect described above, moisture exclusion capability of the shielding element is enhanced and a physical adsorption effect of the gas adsorption material is maintained for a longer period.

According to the thirteenth and fourteenth aspects described above, the acoustic connection section functions as a part of the sealing means.

According to the fifteenth aspect described above, in the case where the sound absorbing structure is used, for example, as a sound absorbing wall installed in the vicinity of a noise source such as a road, a railroad, a factory or the like, a physical adsorption effect of the gas adsorption material is maintained for a long period even in a circumstance where there exist a number of substances reducing the physical adsorption effect of the gas adsorption material.

According to the seventeenth aspect described above, sound absorption capability in a band which includes a resonance frequency and frequencies near the resonance frequency is further enhanced. In addition, the sound absorption capability in a band which does not include the resonance frequency and frequencies near the resonance frequency is also enhanced.

According to the eighteenth aspect described above, sound absorption capability is further improved.

According to the nineteenth aspect described above, an amount of sound to be absorbed is increased.

BRIEF DESCRIPTION OF THE DRAWINGS

FIG. 13 is a perspective view showing an example where a sound absorbing structure 3 is formed as a sound absorbing wall to be provided in the vicinity of a noise source such as a road, a railroad, a factory or the like.

FIG. 15 shows an example where an active noise control technology is used for a sound absorbing structure 4 provided as a sound absorbing wall in the vicinity of a noise source such as a road, a railroad, a factory or the like.

Figure 1:
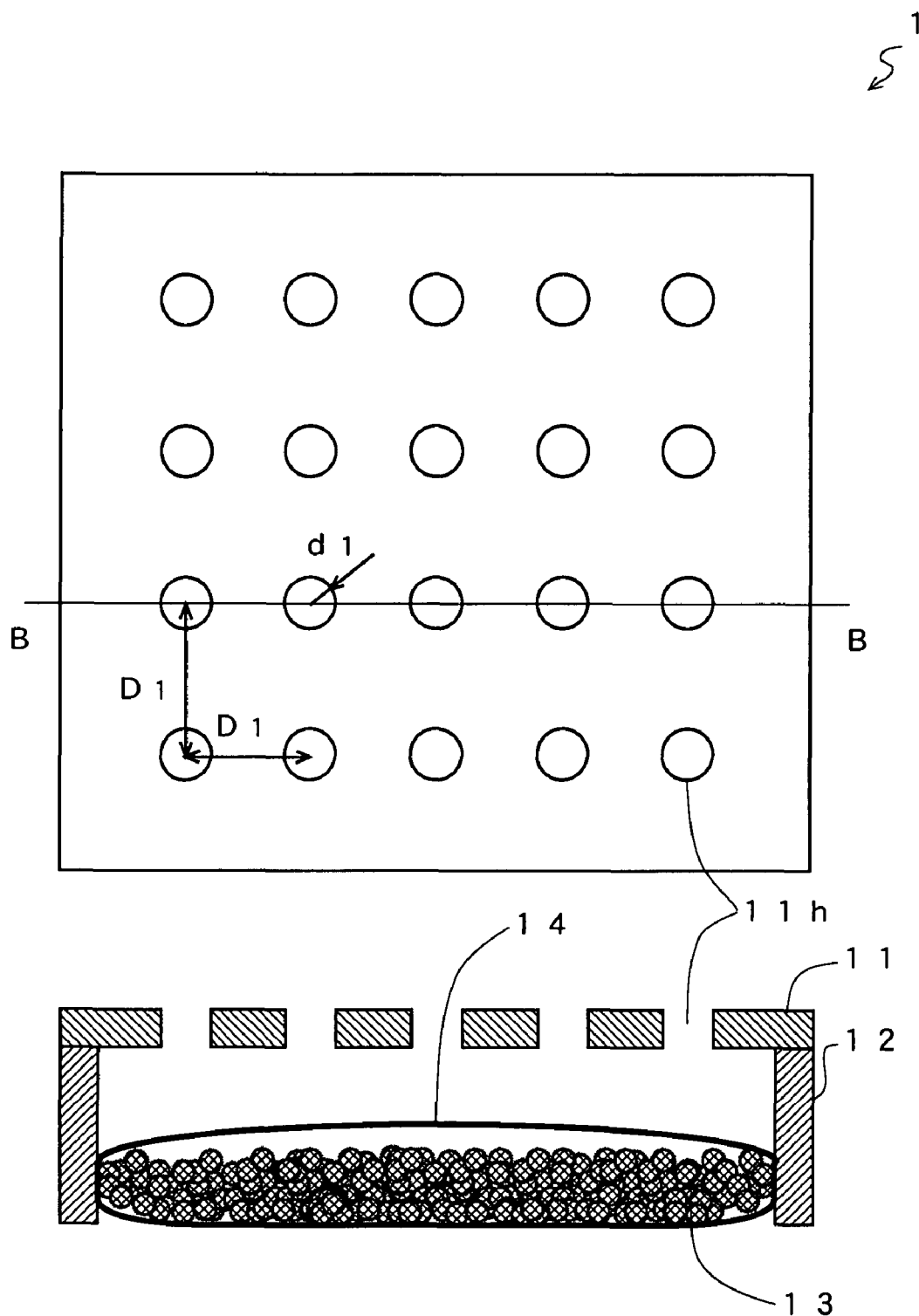
FIG. 1 shows a front view of a sound absorbing structure 1 and a cross-section view, taken along a line BB, of the sound absorbing structure 1.

DESCRIPTION OF THE REFERENCE CHARACTERS 11, 21, 31 front board
12, 22, 32 side board
13 gas adsorption material
14 shielding element
15 wall
16, 26, 36, 46 back board
141c diaphragm
142c edge
17 sound absorbing element
21 front board
27 acoustic port
37 partition plate
40 housing
41 speaker
42 microphone
43 control circuit

DETAILED DESCRIPTION OF THE INVENTION

First Embodiment

Figure 2:
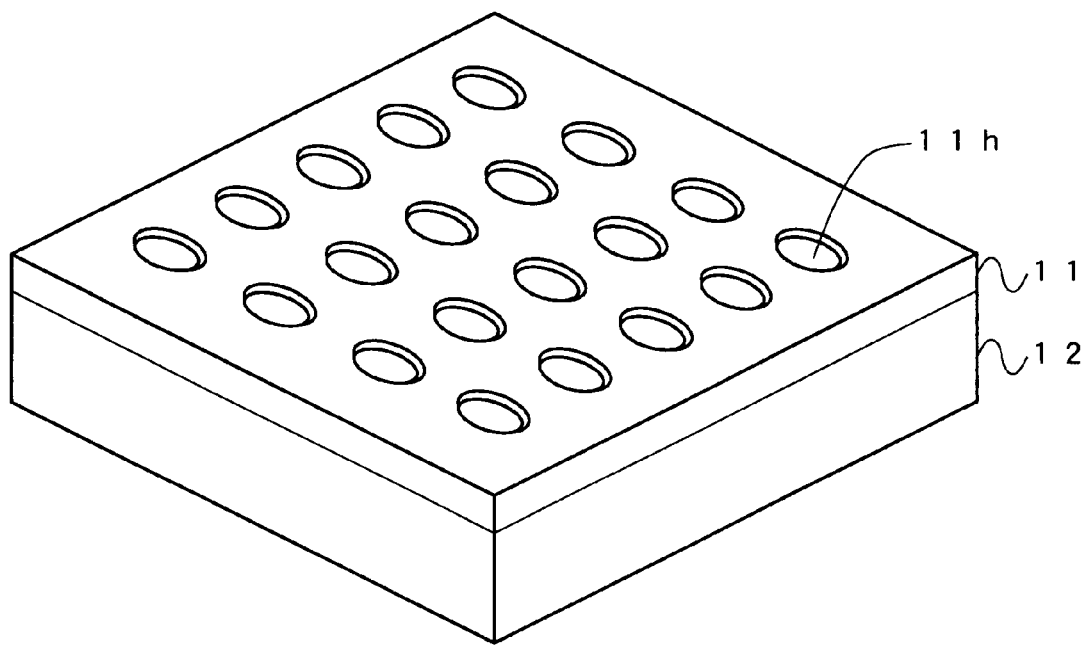
FIG. 2 is a perspective view of a sound absorbing structure 1.
Figure 3:
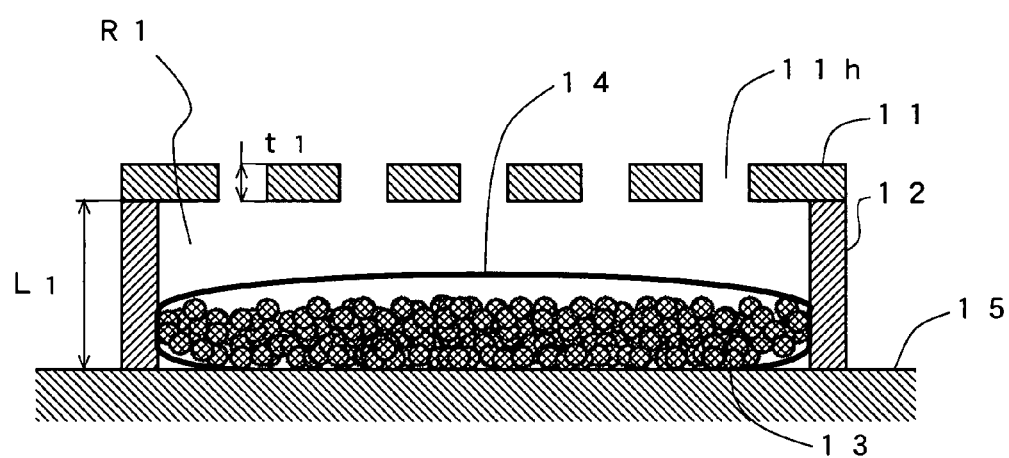
FIG. 3 is a cross-sectional view showing the sound absorbing structure 1 installed on a wall 15.

First, a sound absorbing structure 1 according to a first embodiment of the present invention will be described with reference to FIGS. 1 to 3. FIG. 1 shows a front view of the sound absorbing structure 1 and a cross-sectional view, taken along a line BB, of the sound absorbing structure 1. FIG. 2 shows a perspective view of the sound absorbing structure 1. FIG. 3 is a cross sectional view showing a structure of the sound absorbing structure 1 installed on a wall 15.

As shown in FIG. 1, the sound absorbing structure 1 comprises a front board 11, side boards 12, a gas adsorption material 13 and a shielding element 14. The front board 11 is a plate-like element such as a plywood plate, a hard fiberboard plate made of plaster or the like, a metal plate, and so on. In FIG. 1, a front surface of the front board 11 is square-shaped by way of example. In the front board 11, a plurality of openings 11h are formed. A shape of each opening 11h is, for example, round or slit-shaped. As shown in FIG. 1, as an example, the openings 11h are formed uniformly in the front board 11 without being positioned disproportionately to each other. Also, all the openings 11h have the same shape. The side boards 12 are each a plate-like element such as a plywood plate, a hard fiberboard plate, a metal plate, or the like. The side boards 12 are fixed to entire edges of the front board 11.

The gas adsorption material 13 is a porous material for physically adsorbing gas. The shielding element 14 is an element for shielding gas. The shielding element 14 is structured by a film, for example. The shielding element 14 is a pouch-shaped element and is fixed to inner surfaces of the side boards 12. The gas adsorption material 13 is placed inside of the shielding element 14. The gas adsorption material 13 and the shielding element 14 will hereinafter be described in detail.

The sound absorbing structure 1 shown in FIG. 1 is installed, for example, on a ceiling or on a wall of a house as shown in FIG. 3. FIG. 3 shows a case where the sound absorbing structure 1 is installed on the wall 15. In this case, an interior space, which is surrounded by the front board 11, the sideboards 12 and the wall 15, of the sound absorbing structure 1 is a space R1.

Hereinafter, an operation of the sound absorbing structure 1 installed on the wall 15 will be described. As shown in the front view of FIG. 1, the openings 11h are formed uniformly, and all the openings 11h have the same shape. In this case, a resonance frequency f1 is determined by both a mass of air of an opening 11h and air stiffness of a volume obtained by dividing a volume of the space R1 by the number of openings. Then, the resonance frequency f1 in the case where the gas adsorption material 13 is not placed inside of the sound absorbing structure 1 is represented by the equation below which is the same as the equation (4) above. Here, an effective radius of the opening 11h is d1; a length of the opening 11h is t1; a distance from the front board 11 to the wall 15 is L1; and a spacing between the openings 11h is D1.

[equation 5]

$$f_1 = \frac{c}{2\pi}\sqrt{\frac{P}{(t_1 + d_1)L_1}} \quad \text{here,} \quad P = \frac{\pi d_1^2}{D_1^2} \tag{5}$$

The above-described mass of air is an acoustic mass (hereinafter, referred to as an acoustic mass), which acoustically connects an exterior space and an interior space of the sound absorbing structure 1, thereby causing a Helmholtz resonance to occur. Therefore, the openings 11h each function as the acoustic mass for acoustically connecting the exterior space and the interior space of the sound absorbing structure 1.

A sound propagated from the exterior space of the sound absorbing structure 1 via the openings 11h causes the shielding element 14 to vibrate. Due to the vibration, pressure within the shielding element 14 varies. Inside the shielding element 14, the gas adsorption material 13 is placed. Owing to a physical adsorption effect of the gas adsorption material 13, a change in the pressure within the shielding element 14 is suppressed. As a result, a change in the pressure within the space R1 is suppressed. In other words, air stiffness of the space R1 decreases, and the volume of the space R1 is equivalently expanded. Therefore, a resonance frequency F1 in the case where the gas adsorption material 13 is placed inside of the sound absorbing structure 1 is lower than the resonance frequency f1 represented by the equation (5) above. Then, the Helmholtz resonance effect causes influx and efflux of air at the openings 11h to intensify in a band which includes the resonance frequency F1 and frequencies near the resonance frequency F1. Consequently, due to friction between air and the sound absorbing structure 1, a sound in the band which includes the resonance frequency F1 and frequencies near the resonance frequency F1 is absorbed. The above-mentioned physical adsorption effect of the gas adsorption material 13 will hereinafter be described.

Next, the gas adsorption material 13 will be described in detail. The gas adsorption material 13 is, as mentioned above, a porous material for physically adsorbing gas. An example of the porous material includes activated carbon, zeolite and a carbon nanotube. The gas adsorption material 13 may be any other porous material which has a same physical adsorption effect as that of activated carbon, zeolite and a carbon nanotube. Also, the gas adsorption material 13 may be a granular porous material, a fibrous porous material, a felt porous material, or a nonwoven-fabric porous material. Also, the gas adsorption material 13 may be formed by combining any of these granular, fibrous, felt and nonwoven porous materials. The gas adsorption material 13 shown in FIG. 1 is a granular porous material. Further, the gas adsorption material 13 may be a mass formed by agglutinating a granular porous material. Alternatively, the gas adsorption material 13 may be a mass formed by agglutinating any of a cut-up fibrous porous material, a cut-up felt porous material or a cut-up nonwoven-fabric porous material. Further alternatively, the gas adsorption material 13 may be a mass formed by agglutinating a combination of any of these granular, fibrous, felt and nonwoven-fabric porous materials.

Figure 4:
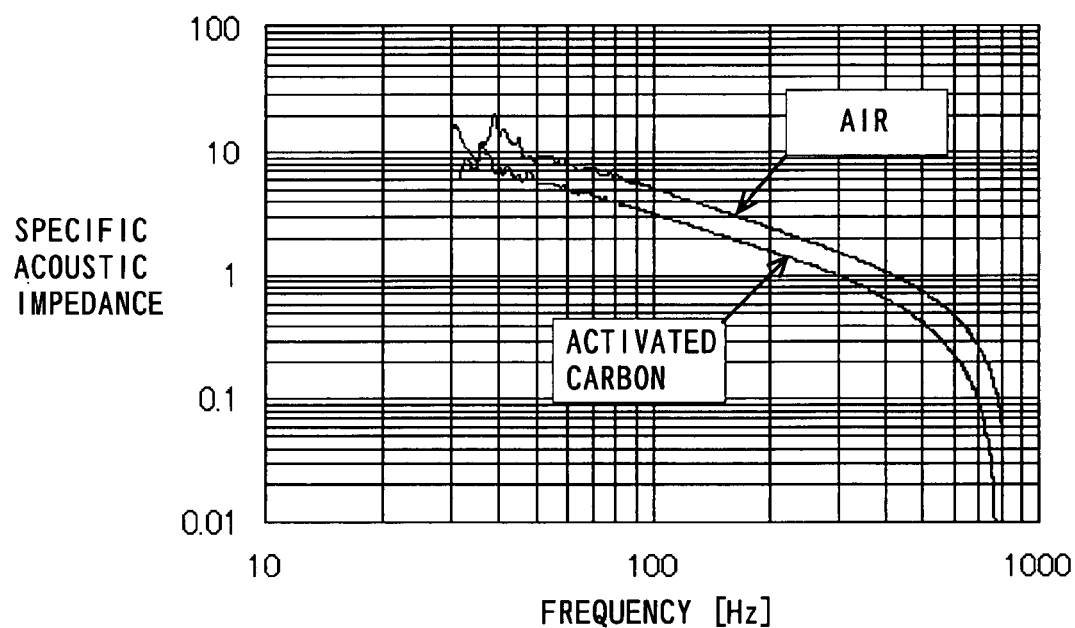
FIG. 4 shows a result of measuring, for each of air and activated carbon, an imaginary number component of specific acoustic impedance (absolute value).

Hereinafter, the above-mentioned physical adsorption effect of the gas adsorption material 13 will be described. Due to sound pressure such as a noise propagated from the exterior space of the sound absorbing structure 1, pressure near pores formed in a surface of the gas adsorption material 13 varies. The more the pressure near the pores increases, the more the amount of air molecules physically adsorbed by the pores increases. Conversely, the more the pressure near the pores decreases, the more the amount of air molecules physically adsorbed by the pores decreases. Owing to such a physical adsorption effect of the gas adsorption material 13, a change in the pressure near the gas adsorption material 13 is suppressed. Here, FIG. 4 shows a result of measuring, for each of air and activated carbon, an imaginary number component of specific acoustic impedance (absolute value). As seen in FIG. 4, the imaginary number component of specific acoustic impedance of activated carbon is smaller than that of air. To be more specific, when activated carbon is placed inside of the sound absorbing structure 1, the air stiffness of the space R1 decreases. In other words, when activated carbon is placed in the space R1 of the sound absorbing structure 1, a value of the air stiffness of the space R1 is equivalent to that of a space having a larger volume than the volume of the space R1. As a result, the volume of the space R1 is equivalently expanded. Note that zeolite and a carbon nanotube, which both have a large specific surface area, provide the same physical adsorption effect as that of the aforementioned activated carbon.

Next, the shielding element 14 will be described in detail. The shielding element 14 is an element for shielding gas. The shielding element 14 is structured by, for example, a film. Also, the shielding element 14 is formed into a pouch-shaped element, for example. The shielding element 14 is preferably structured by a material having sufficient durability in consideration of a location where the shielding element 14 is provided. Also, the shielding element 14 is preferably structured by a material being as thin as possible and having as high plasticity as possible. The reason for this is that the thinner and the more plastic the shielding element 14 is, the more efficiently the sound pressure is transmitted to the gas adsorption material 13.

An example of a material of the shielding element 14 includes: a macromolecular material such as PP (polypropylen), PE (polyethylene), PVA (vinylon), PET (polyethylene terephthalate), PC (polycarbonate), PVDC (polyvinylidene chloride), fluororesin and the like; and rubber macromolecule elastomer having plasticity, such as SBR (styrene-butadiene rubber), SBS (styrene-butadiene-styrene rubber), silicon rubber, IIR (isobutylene-isoprene rubber), EPM (ethylene propylene rubber), urethane rubber, an alteration of any of these rubber materials mentioned above, and the like. Also, the material of the shielding element 14 may be a complex of those materials described above.

The shielding element 14 may also be produced from a material containing any of SiO2 (silicon-dioxide), Al (aluminum) and alumina. In other words, the shielding element 14 may be produced from a material containing only one of SiO2 (silicon dioxide), Al (aluminum) and alumina, or may be produced from a material containing a combination of these substances. These materials enhance moisture exclusion capability of the film. If the shielding element 14 is, for example, a film, the film may include a layer made of any one of SiO2 (silicon dioxide), Al (aluminum) and alumina. Also, the shielding element 14 may include a layer made of a combination of these substances. In particular, when a thin film of SiO2 (silicon dioxide), Al (aluminum) or alumina is deposited on a resin film, plasticity of the film is enhanced.

As described above, the sound absorbing structure 1 according to the present embodiment has the gas adsorption material 13 placed therein. Therefore, the volume of the space R1 in the sound absorbing structure 1 is equivalently expanded. Consequently, in the sound absorbing structure 1 according to the present embodiment, a resonance frequency can be lowered without increasing a size of the sound absorbing structure 1. In other words, a sound can be absorbed in a low frequency band without increasing the size of the sound absorbing structure 1. Thus, in the sound absorbing structure 1 according to the present embodiment, sound absorption capability in a low-pitched range is enhanced as compared to a conventional art. Also, when sound absorption is performed in a conventionally used frequency band by using the sound absorbing structure 1 according to the present embodiment, the sound absorbing structure 1 can be decreased in size as compared with the sound absorbing structure of the conventional art.

The sound absorbing structure 1 according to the present embodiment has the gas adsorption material 13 placed inside of the shielding element 14. When the gas adsorption material 13 contacts organic matter such as formaldehyde and acetaldehyde, moisture, or the like, the physical adsorption effect is decreased. More specifically, when the pores formed in the gas adsorption material 13 are clogged with those organic matter or moisture, the physical adsorption effect is decreased. As a result, the sound absorption capability in a low-pitched range is decreased. Note that organic matter such as formaldehyde and acetaldehyde is contained in a solvent used for building materials and in cigarette smoke, for example. Moisture is readily adsorbed onto the gas adsorption material 13 when an ambient humidity level increases. Also, moisture is adsorbed onto the gas adsorption material 13 by building up dew condensation due to an ambient temperature change. Meanwhile, the shielding element 14 is an element for shielding gas. Therefore, by placing the gas adsorption material 13 inside of the shielding element 14, the gas adsorption material 13 is sealed off from the above-described organic matter, moisture or the like. Accordingly, a decrease of the physical adsorption effect of the gas adsorption material 13 is prevented. As a result, even in the case, for example, where the sound absorbing structure 1 is installed in an environment such as an outdoor location where the physical adsorption effect of the gas adsorption material 13 readily decreases, the physical adsorption effect is prevented from decreasing. In other words, whatever the environment in which the sound absorbing structure 1 is installed, high sound absorption capability in a low-pitched range is maintained for a long period.

By being installed on the wall 15, the sound absorbing structure 1 shown in FIG. 1 is able to use the wall 15 so as to form the space R1. Accordingly, the number of components comprising the sound absorbing structure is decreased.

Although the front board 11 and the side boards 12 of the sound absorbing structure 1 are separately provided in the description above, the present invention is not limited thereto.

For example, the front board 11 and the side boards 12 may be provided as a single component.

Figure 5:
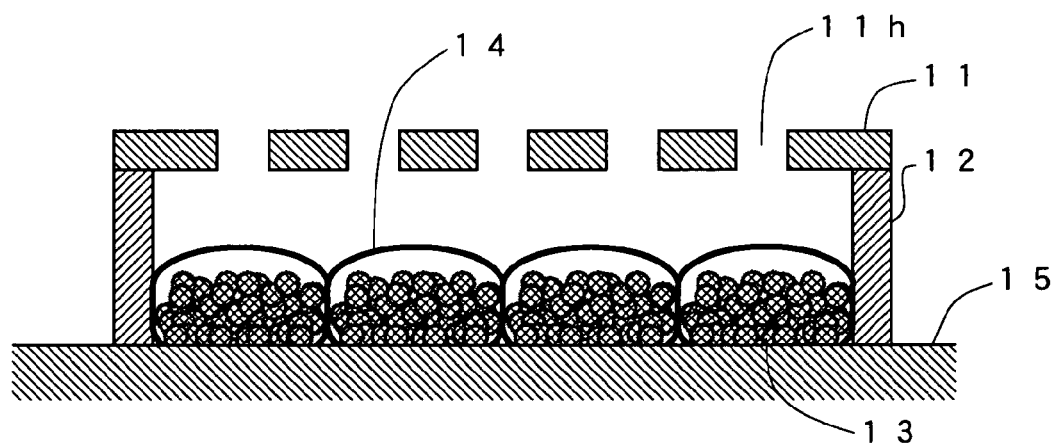
FIG. 5 shows a case where a plurality of pouch-shaped shielding elements 14 are provided.

The gas adsorption material 13 is placed inside of one shielding element 14 in the description above. However, the present invention is not limited thereto. As shown in FIG. 5, there may be a plurality of pouch-shaped shielding elements 14. FIG. 5 shows a case where the plurality of pouch-shaped shielding elements 14 are provided. Inside each shielding element 14, the gas adsorption material 13 is placed.

It is preferred for the shielding element 14 described above that a certain size of space is present between a front surface of the shielding element 14 (at the side of the opening 11h) and a front surface of the gas adsorption material 13 so that the shielding element 14 may not contact the gas adsorption material 13 even when the shielding element 14 vibrates. The reason for this is that when the shielding element 14 vibrates due to a sound entering through the openings 11h, an abnormal noise is generated if the shielding element 14 contacts the gas adsorption material 13.

Figure 6:
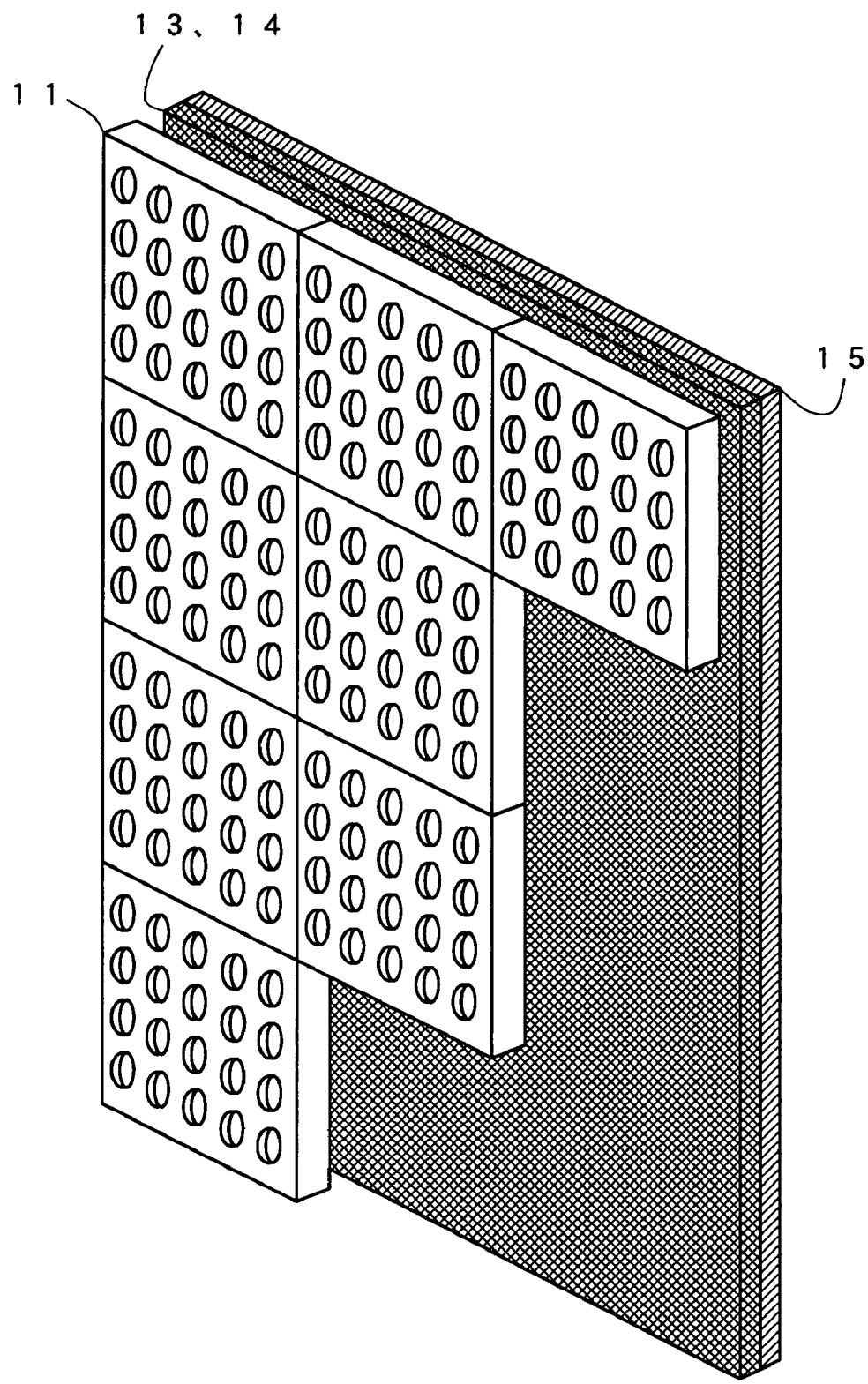
FIG. 6 is a perspective view showing an example where the sound absorbing structure 1 is in a different size.

The size of the sound absorbing structure 1 described above may correspond to a size of a plurality of sound absorbing structures 1 as shown in FIG. 6. FIG. 6 is a perspective view showing an example where the sound absorbing structure 1 is in a different size. In FIG. 6, a plurality of sound absorbing structures 1 as shown in FIG. 1 are arranged and the side boards 12 which are adjacent to each other are removed. In other words, the side boards 12 are provided only at most outer sides of a structure formed by arranging the plurality of sound absorbing structures 1. In FIG. 6, an example, in which the sound absorbing structure 1 has a size of the plurality of sound absorbing structures 1, is given. Here, assume that the wall 15 shown in FIG. 6 is one of four walls of a room and there is a ceiling on the upper side of FIG. 6. Also, there is a floor on the lower side of FIG. 6. In this case, when a top side of the sound absorbing structure 1 contacts the ceiling, the side boards 12 which structure the top side contacting the ceiling may be removed so that the ceiling may function as the side board of the sound absorbing structure 1. The sound absorbing structure 1 in this case has a structure in which the side boards 12 are removed from only one side. Similarly, when the top side of the sound absorbing structure 1 contacts the ceiling and also a bottom side of the sound absorbing structure 1 contacts the floor, the side boards 12 structuring the top and bottom sides contacting the ceiling and the floor may be removed. The sound absorbing structure 1 in this case has a structure in which the side boards 12 are removed from two sides. Thus, when a side of the sound absorbing structure 1 contacts the ceiling, the floor or any of the four walls other than the wall 15, the side boards 12 which structure the side may be removed. Further, when all the sides (four sides) of the sound absorbing structures 1 contact the ceiling, the floor, and walls other than the wall 15, among the four walls, all the sideboards 12 contacting the four sides may be removed.

Figure 7:
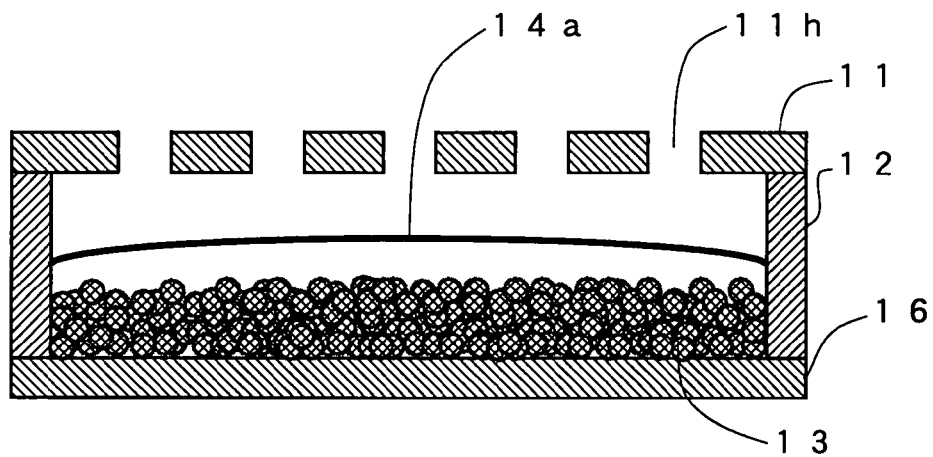
FIG. 7 is a cross-sectional view showing the sound absorbing structure 1 comprising a backboard 16.

In the description above, the sound absorbing structure 1 comprises the front board 11, the side boards 12, the gas adsorption material 13 and the shielding element 14, and the sound absorbing structure 1 is installed on the wall 15. However, the sound absorbing structure 1 may further comprise a backboard 16. FIG. 7 shows a cross-sectional view showing a structure of the sound absorbing structure 1 having the back board 16. As shown in FIG. 7, having the back board 16 allows the sound absorbing structure 1 to be installed elsewhere than on the wall 15.

In the sound absorbing structure 1 having the back board 16, the shielding element 14 may be a filmy shielding element 14a so as to cover a space formed between the side boards 12 as shown in FIG. 7. In this case, edges of the shielding element 14a are fixed to the inner surfaces of the side boards 12. Therefore, the gas adsorption material 13 is sealed off from the outside owing to the shielding element 14a, the sideboards 12 and the backboard 16. A sound propagated from the exterior space of the sound absorbing structure 1 is efficiently transmitted to the gas adsorption material 13 through the filmy shielding element 14a. The side boards 12 and the back board 16 are preferably structured by a material having an equivalent shelter density to that of the shielding element 14.

Figure 8:
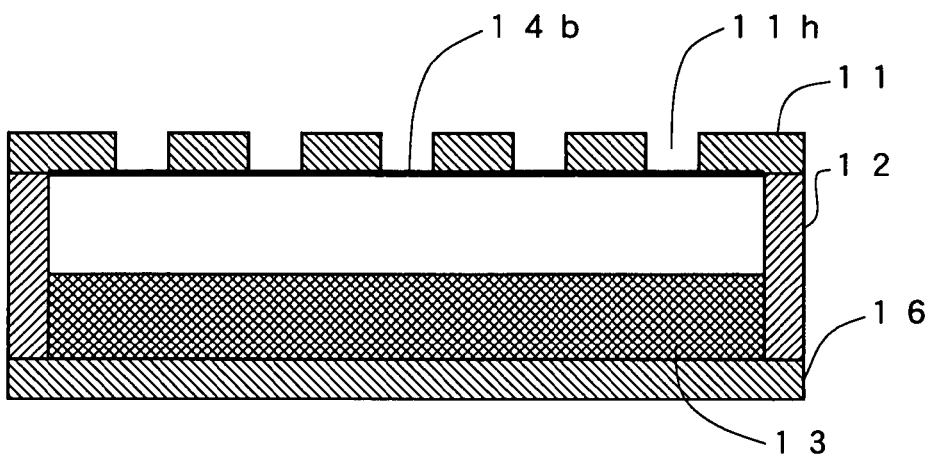
FIG. 8 shows another example of the shielding element 14 in the sound absorbing structure 1 comprising the back board 16.

Also, in the sound absorbing structure 1 having the back board 16, the shielding element 14 may be a filmy shielding element 14b which is fixed on the back (inner surface) of the front board 11 as shown in FIG. 8. FIG. 8 shows another example of the shielding element 14 provided for the sound absorbing structure 1 having the back board 16. In FIG. 8, as an example, the gas adsorption material 13 is agglutinated into a mass. As shown in FIG. 8, the shielding element 14b is fixed on the inner surface of the front board 11. Due to a sound propagated from the exterior space of the sound absorbing structure 1, portions of the shielding element 14b, which are located at the openings 11h, vibrate. Due to this vibration, the sound is transmitted to the interior space of the sound absorbing structure 1. Thus, the portions of the shielding element 14b, which are located at the openings 11h, each act as an acoustic connection section functioning as an acoustic mass which acoustically connects the exterior space and the interior space (the space R1) of the sound absorbing structure 1, thereby causing the Helmholtz resonance to occur. Also, the portions of the shielding element 14b, which are located at the openings 11h, function as a part of sealing means for sealing the gas adsorption material 13. The shielding element 14b may cover only the openings 11h. Also, the shielding element 14b may be fixed not only to the inner surface of the front board 11, but also to the inner surfaces of the side boards 12 and an inner surface of the back board 16. In other words, the shielding element 14b may be fixed to entire inner surfaces of the sound absorbing structure 1.

Figure 9:
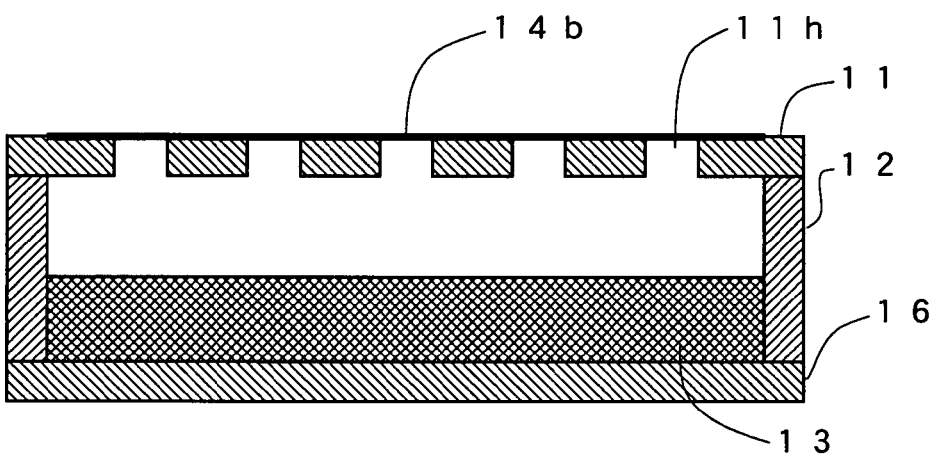
FIG. 9 shows an example of a shielding element 14b fixed on a front surface of the front board 11.

Further, as shown in FIG. 9, the shielding element 14b shown in FIG. 8 may be fixed on a front surface (outer surface) of the front board 11. FIG. 9 shows an example in which the shielding element 14b is fixed on the front surface of the front board 11. In this case, the shielding element 14b may cover only the openings 11h. Also, in this case, the shielding element 14b may be fixed not only on the front board 11, but also on entire outer surfaces of the sound absorbing structure 1. In other words, the sound absorbing structure 1 may be wrapped up by the shielding element 14b.

Figure 10:
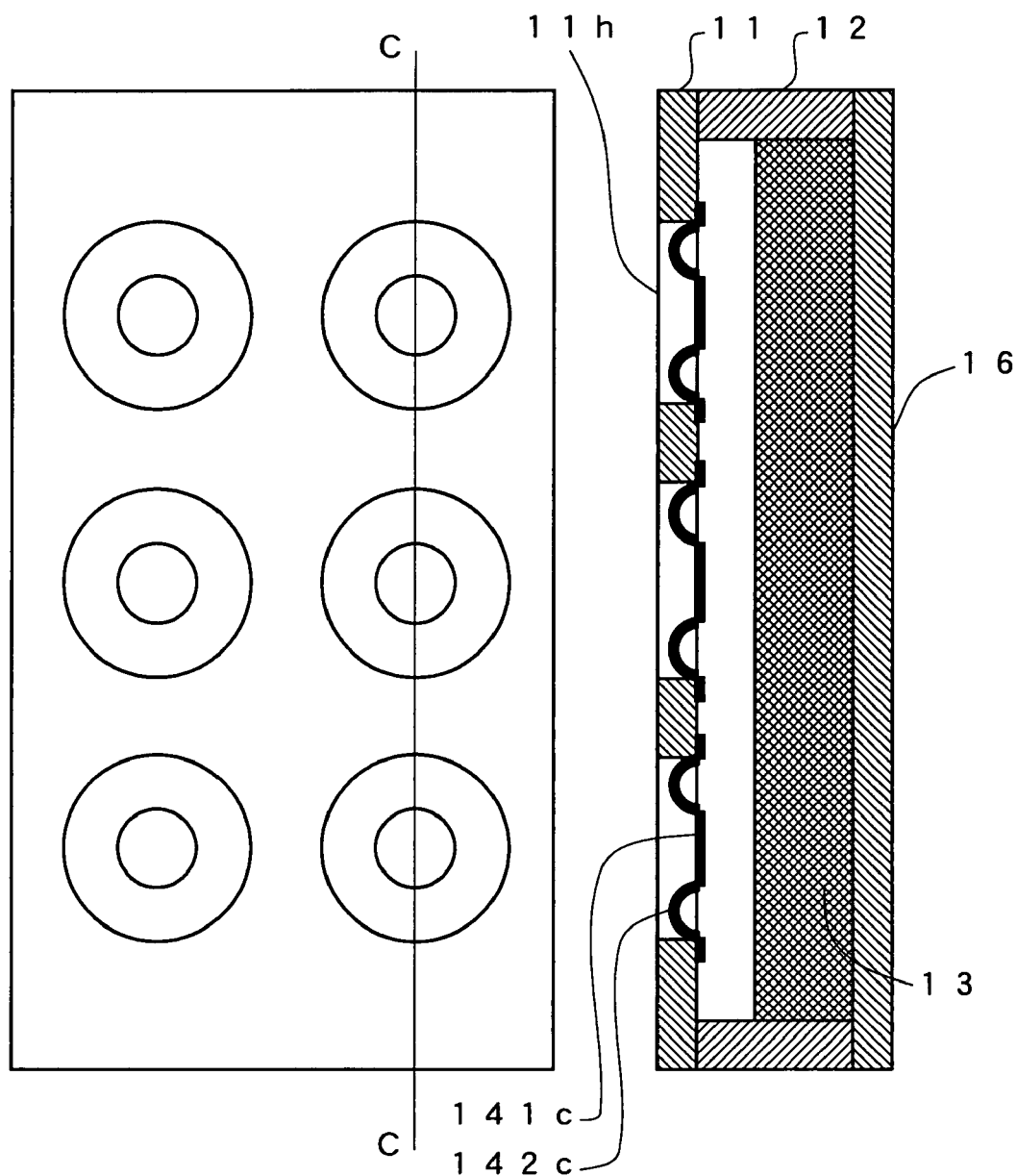
FIG. 10 shows a front view of the sound absorbing structure 1 and a cross-sectional view, taken along a line CC, of the sound absorbing structure 1, in which a diaphragm 141c and an edge 142c are provided at each opening 11h.

In the sound absorbing structure 1 having the back board 16, the shielding element 14 may be structured by a diaphragm 141c and an edge 142c as shown in FIG. 10. FIG. 10 shows a front view of the sound absorbing structure 1 and a cross-sectional view, taken along a line CC, of the sound absorbing structure 1 in which the diaphragm 141c and the edge 142c are provided at each opening 11h.

The diaphragm 141c is, for example, a plate-like element. An inner perimeter portion of the edge 142c is fixed to an outer perimeter portion of the diaphragm 141c. An outer perimeter portion of the edge 142c is fixed to each opening 11h formed in the front board 11. Thus, the edge 142c is a supporting element for supporting the diaphragm 141c so as to enable the diaphragm 141c to vibrate inwards and outwards (to the right and left in FIG. 10). The diaphragm 141c and the edge 142c are provided at each of the openings 11h. The gas adsorption material 13 is sealed off from gas outside by the diaphragm 141c, the edge 142c, the front board 11, the side boards 12 and the back board 16. In this case, the diaphragm 141c, the edge 142c, the front board 11, the side boards 12 and the back board 16 are preferably structured by a material having an equivalent shelter density to that of the shielding element 14. Due to a sound propagated from the exterior space of the sound absorbing structure 1, the diaphragm 141c and the edge 142c vibrate. Due to this vibration, the sound is transmitted to the space R1 of the sound absorbing structure 1. Thus, the diaphragm 141c and the edge 142c act as the acoustic connection section functioning as an acoustic mass which acoustically connects the exterior space and the interior space (the space R1) of the sound absorbing structure 1, thereby causing the Helmholtz resonance to occur. The diaphragm 141c and the edge 142c are generally referred to as a drone cone.

By designing the edge 142c such that stiffness thereof is low, sound pressure can be readily transmitted to the space R1 of the sound absorbing structure 1. Both a weight of the diaphragm 141c and stiffness of the edge 142c may be set to different values for each opening 11h. More specifically, both the diaphragm 141c and the edge 142c may function as a different acoustic mass for each opening 11h. This enables a different resonance frequency to be set for each opening 11h. As a result, the sound absorbing structure 1 can perform sound absorption in a plurality of bands, each of which includes a resonance frequency and frequencies near the resonance frequency. Then, the sound absorbing structure 1 capable of performing sound absorption in a wideband is realized. Note that the above-described setting of different resonance frequencies can be realized without using the diaphragm 141c and the edge 142c. For example, in FIG. 1 described above, a different resonance frequency for each opening 11h is set by adjusting the radius d1 and the length t1 of each opening 11h.

Figure 11:
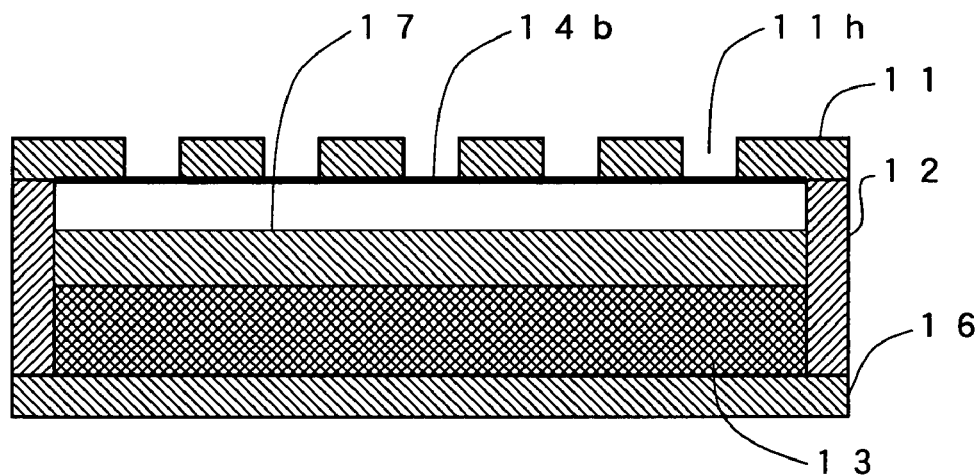
FIG. 11 is a cross-sectional view showing an example where a structure of the sound absorbing structure 1 comprising the back board 16 as shown in FIG. 7 has a sound absorbing element 17 provided therein.

The sound absorbing structure 1 as shown in FIG. 1, which is installed on the wall 15, and the sound absorbing structure 1 having the back board 16 as shown in FIG. 7 may each further comprise a sound absorbing element 17. FIG. 11 is a cross-sectional view showing an example in which the sound absorbing structure 1 having the back board 16 as shown in FIG. 7 has the sound absorbing element 17 placed therein.

The sound absorbing element 17 may be, for example, glass wool, rock wool, slag wool, resin foam or porous cast iron. When the sound absorbing element 17 is structured by any of these materials, the sound absorption capability of the sound absorbing element 17 is enhanced. The sound absorbing element 17 may be structured by a combination of these materials. Also, the sound absorbing element 17 may be a mixture with the gas adsorption material 13. The sound absorbing element 17 is positioned such that a predetermined space is present between the sound absorbing element 17 and the shielding element 14b. The predetermined space has a particular size such that the shielding element 14b and the sound absorbing element 17 do not contact each other when the shielding element 14b vibrates due to sound pressure from the exterior space. A location in which the sound absorbing element 17 is placed is not limited to the location shown in FIG. 11, and may be a location where the sound absorbing element 17 is not sealed off from gas outside. For example, the sound absorbing element 17 may be placed between the shielding element 14b and the front board 11. As another example, the sound absorbing element 17 may be placed on the front surface (outer side) of the front board 11.

When the sound absorbing structure 1 resonates, the shielding element 14b present at the openings 11h vibrates intensively. Due to this vibration, friction between air and the sound absorbing element 17 increases. Accordingly, aerial vibration is converted to heat, and thus the sound absorption capability of the sound absorbing structure 1 is further enhanced. Here, the sound absorbing element 17 has a capability of absorbing a sound having a frequency other than a resonance frequency. The gas adsorption material 13 also has this capability. However, the gas adsorption material 13 is produced from specific materials for the physical adsorption effect, and therefore the sound absorption capability of the gas adsorption material 13 is not as high as that of the sound absorbing element 17. For this reason, the sound absorbing structure 1 can have further enhanced sound absorption capability in a band which includes a resonance frequency and frequencies near the resonance frequency by further comprising the sound absorbing element 17. Also, the sound absorption capability in a band which does not include the resonance frequency and frequencies near the resonance frequency is enhanced. The greater the friction between the sound absorbing element 17 and air is, the higher the sound absorption capability is. Therefore, the sound absorbing element 17 is preferably placed as close to the openings 11h as possible while retaining the above-described predetermined space.

Second Embodiment

Figure 12:
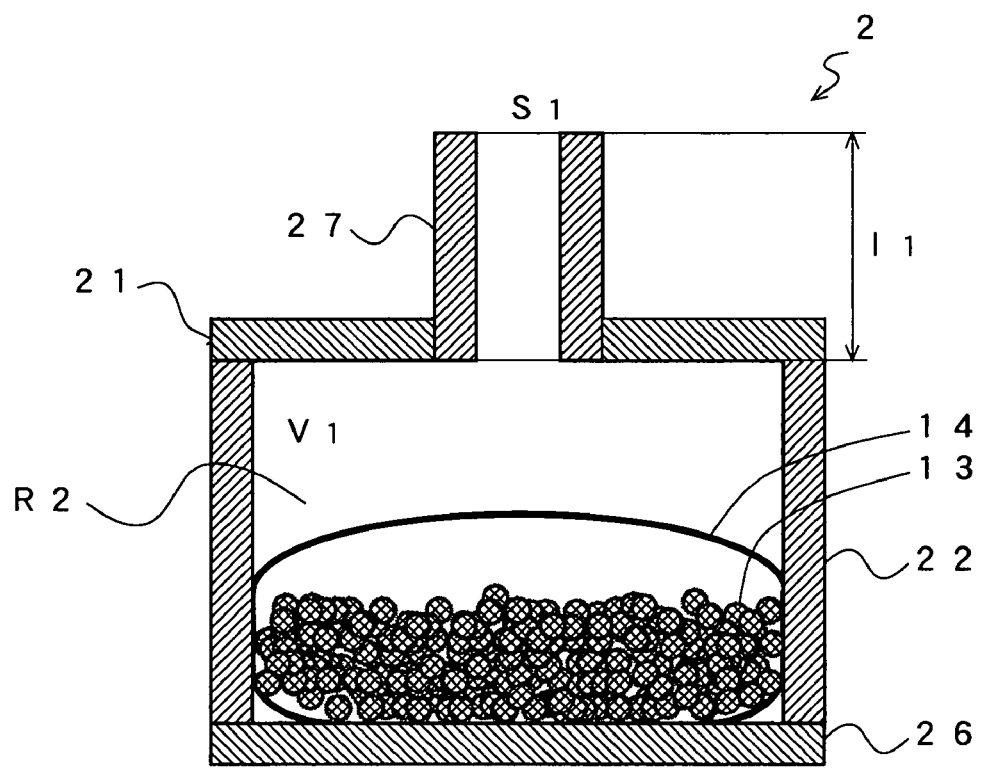
FIG. 12 is a cross-sectional view showing an exemplary structure of a sound absorbing structure 2.

A sound absorbing structure 2 according to a second embodiment of the present invention will be described with reference to FIG. 12. FIG. 12 is a cross-sectional view showing an exemplary structure of the sound absorbing structure 2. The sound absorbing structure 2 comprises a front board 21, side boards 22, a back board 26, an acoustic port 27, the gas adsorption material 13 and the shielding element 14. The sound absorbing structure 2 according to the present embodiment differs from the sound absorbing structure 1 described in the first embodiment only in that the sound absorbing structure 2 has only one opening formed in the front board 21 and the acoustic port 27 is newly provided therefor. Therefore, except for these differences, the second embodiment is identical to the first embodiment and descriptions thereof will be omitted. The sound absorbing structure 2 in the present embodiment comprises the back board 26. Here, the back board 26 may be the wall 15 or the like. In other words, the sound absorbing structure 2 may be structured by the front board 21, the side boards 22, the acoustic port 27, the gas adsorption material 13 and the shielding element 14. Hereinafter, a description will be given with a focus on the above-mentioned differences.

In the front board 21, an opening is formed. The acoustic port 27 is a tubular element. The acoustic port 27 is fixed at the opening formed in the front board 21. Here, the acoustic port 27 is the acoustic connection section functioning as an acoustic mass which acoustically connects an exterior space and an interior space of the sound absorbing structure 2, thereby causing the Helmholtz resonance to occur. Here, the interior space of the sound absorbing structure 2, which is surrounded by the front board 21, the side boards 22 and the back board 26, is a space R2. The gas adsorption material 13 is placed inside of the shielding element 14. The shielding element 14 is placed in the space R2 of the sound absorbing structure 2.

Next, an operation of the sound absorbing structure 2 according to the present embodiment will be described. First, a case where the gas adsorption material 13 is not placed in the space R2 of the sound absorbing structure 2 will be described. Here, a volume of the space R2 is V1; a sound velocity is c; a radius (or effective radius) of the opening at the acoustic port 27 is r1; a length of the opening at the acoustic port 27 is l1; and an air density is $\rho$. In this case, an air stiffness component S1 of the volume V1 is represented by the equation below.

[equation 6]

$$S_1 = \frac{\rho c^2 \pi^2 r_1^4}{V_1} \quad (6)$$

Also, a mass of air, m1, of the acoustic port 27 is represented by the equation below.

$$m_1 = \rho \pi r_1^2 (l_1 + r_1) \quad (7)$$

Due to these air stiffness component S1 and mass of air m1, the Helmholtz resonance occurs. A resonance frequency f2 is represented by the following equation based on the above equations (6) and (7).

$$f_2 = \frac{1}{2\pi}\sqrt{\frac{S_1}{m_1}} = \frac{c}{2\pi}\sqrt{\frac{\pi r_1^2}{V_1(l_1 + r_1)}} \quad (8)$$

A sound propagated from the exterior space of the sound absorbing structure 2 via the opening of the acoustic port 27 vibrates the shielding element 14. Due to the vibration, pressure inside of the shielding element 14 varies. Inside the shielding element 14, the gas adsorption material 13 is placed. Due to the physical adsorption effect of the gas adsorption material 13, the volume of the space R2 is equivalently expanded. Consequently, a resonance frequency F2 in the case where the gas adsorption material 13 is placed inside of the sound absorbing structure 2 is lower than the resonance frequency f2 represented by the equation (8) described above. Here, the Helmholtz resonance effect causes influx and efflux of air at the opening of the acoustic port 27 to intensify in a band which includes the resonance frequency F2 and frequencies near the resonance frequency F2. As a result, due to friction between air and the sound absorbing structure 2, a sound in the band which includes the resonance frequency F2 and frequencies near the resonance frequency F2 is absorbed.

As described above, the sound absorbing structure 2 according to the present embodiment has one opening formed in the front board 21, and the acoustic port 27 is provided at the opening. Even in the sound absorbing structure 2 having such a structure, the sound absorption capability in a low-pitched range is improved as compared to the conventional art without increasing the size of the sound absorbing structure 2.

The acoustic port 27 described in the present embodiment may be provided at each of the plurality of openings 11h in the sound absorbing structure 1 according to the first embodiment described above.

Third Embodiment

Figure 13:
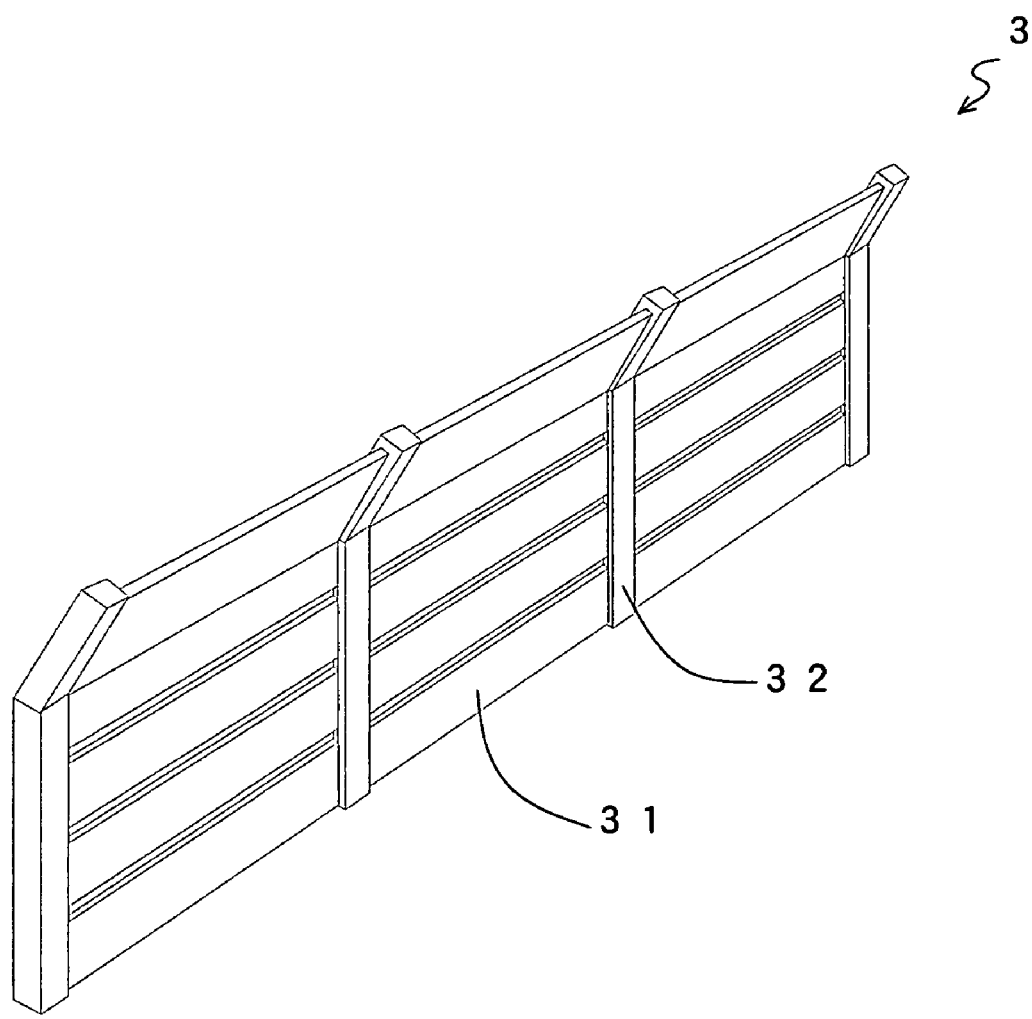
Figure 14:
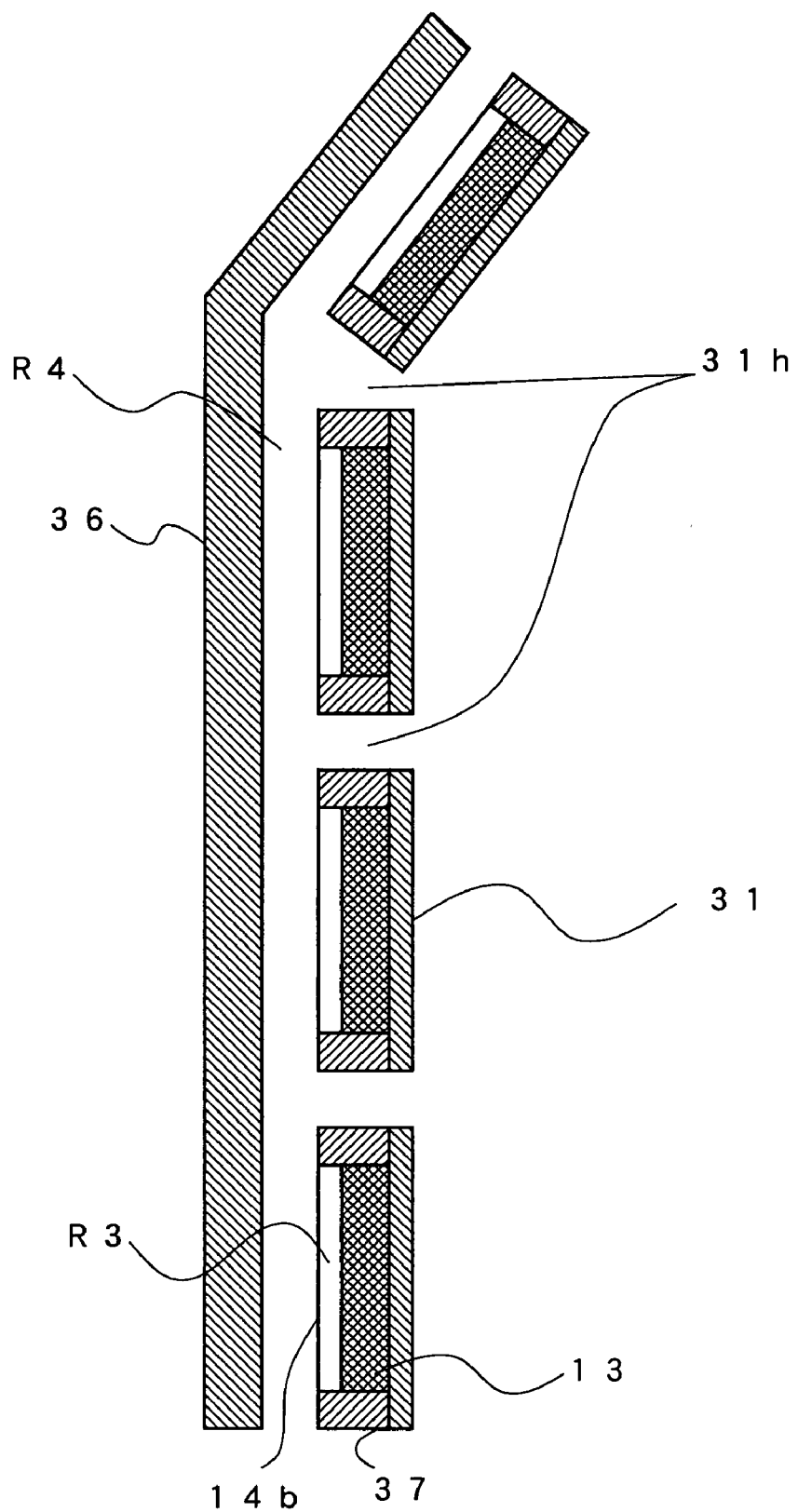
FIG. 14 is a cross-sectional view showing a structure of the sound absorbing structure 3.

A sound absorbing structure 3 according to a third embodiment of the present invention will be described with reference to FIGS. 13 and 14. FIG. 13 is a perspective view showing an example where the sound absorbing structure 3 is structured as a sound absorbing wall to be placed in the vicinity of a noise source such as a road, a railroad, a factory or the like. FIG. 14 is a cross-sectional view showing a structure of the sound absorbing structure 3. The sound absorbing structure 3 comprises a front board 31, side boards 32, a back board 36, partition plates 37, a plurality of the gas adsorption materials 13 and a plurality of the shielding elements 14b. In the sound absorbing structure 3 according to the present embodiment, a placement location of each gas adsorption material 13 substantially differs from that of the above-described sound absorbing structure 1 according to the first embodiment. The plurality of the gas adsorption materials 13 and the plurality of the shielding elements 14b, respectively, are identical to those described in the first embodiment, and thus denoted by the identical reference numerals to those used in the first embodiment. Therefore, detailed descriptions thereof will be omitted. Here, the sound absorbing structure 3 in the present embodiment comprises the back board 36. However, the sound absorbing structure 3 may not comprise the back board 36. In other words, the sound absorbing structure 3 may be structured by the front board 31, the side boards 32, the partition plates 37, the plurality of the gas adsorption materials 13 and the plurality of the shielding elements 14b. The plurality of the shielding elements 14b may be any of the shielding elements 14 described above. Hereinafter, a description will be given with a focus on the above-mentioned difference.

The sound absorbing structure 3 is formed as a sound absorbing wall to be placed in the vicinity of a noise source such as a road, a railroad, a factory or the like. In the front board 31, slit-shaped openings 31h are formed. The partition plates 37 are each a plate-like element fixed on the back of the front board 31. The partition plates 37 are fixed to the front board along long sides of the openings 31h. Also, the partition plates 37 are each fixed to inner sides of the sideboards 32. A plurality of spaces R3 are formed by the partition plates 37 and the front board 31. In other words, the plurality of spaces R3 facing the front board 31 are formed by the partition plates 37. Here, each opening 31h, and the partition plates 37 and the side boards 32 which form said each opening 31h, act as the acoustic connection section functioning as an acoustic mass which acoustically connects an exterior space and an interior space of the sound absorbing structure 3, thereby causing the Helmholtz resonance to occur. Entire edges of each shielding element 14b are fixed to inner sides of the partition plates 37 and the inner sides of the side boards 32 so as to divide off the space R3 at a back side. The plurality of the gas adsorption materials 13 are sealed and placed in the spaces R3, respectively. Among the partition plates 37, partition plates 37 located at an upper edge and a bottom edge of the front board 31 function as sides of the sound absorbing structure according to the present invention.

An operation of the sound absorbing structure 3 according to the present embodiment is identical to that of the sound absorbing structure 1 described in the first embodiment. In other words, an air stiffness component of a volume of a space R4 inside of the sound absorbing structure 3 and a mass of air of the acoustic connection section cause the Helmholtz resonance to occur.

Also, a sound propagated from the exterior space of the sound absorbing structure 3 via the openings 31h vibrates the plurality of the shielding elements 14b. Due to the vibration, pressure inside of the spaces R3 varies. However, the plurality of the gas adsorption materials 13 are placed in the spaces R3, respectively. Consequently, due to the physical adsorption effect of the plurality of the gas adsorption materials 13, the volume of the space R4 is equivalently expanded. Therefore, a resonance frequency in the case where the plurality of the gas adsorption materials 13 are respectively placed in the spaces R3 of the sound absorbing structure 3 is lower than that in the case where the plurality of the gas adsorption materials 13 are not placed in the spaces R3. Here, the Helmholtz resonance effect causes influx and efflux of air at each opening 31h to intensify in a band which includes the low resonance frequency and frequencies near the low resonance frequency. As a result, due to friction between air and the sound absorbing structure 3, a sound in the band which includes the low resonance frequency and frequencies near the low resonance frequency is absorbed.

In the vicinity of a road and a railroad, and in a factory or the like, substances which reduce the physical adsorption effect of the plurality of the gas adsorption materials 13 (for example, dust, dirt, organic matter, moisture and so forth) are likely to be floating in the air. However, in the present embodiment, the plurality of the gas adsorption materials 13 are sealed. Therefore, even in such an environment in the vicinity of a road and a railroad, and inside a factory or the like, the adsorption effect in a low-pitched range is maintained for a long period. Also, when sound absorption is performed in a frequency band which has been conventionally used, a thinner sound absorbing wall can be realized as compared to the conventional art. Further, when a sound absorbing wall having a same thickness as that of the conventional art is used, the sound absorption capability in a low-pitched range is enhanced as compared to the conventional art.

In the description above, an example where the sound absorbing structure 3 is installed on the right side of the back board 36 is given. However, the present invention is not limited thereto. For example, the sound absorbing structure 3 may be installed on the both sides of the back board 36. Also, in the description above, the front board 31 is divided by the partition plates 37. However, a plurality of the sound absorbing structures 1 as shown in FIG. 1 may be arranged and installed on the back board 36, for example.

Fourth Embodiment

Figure 16:
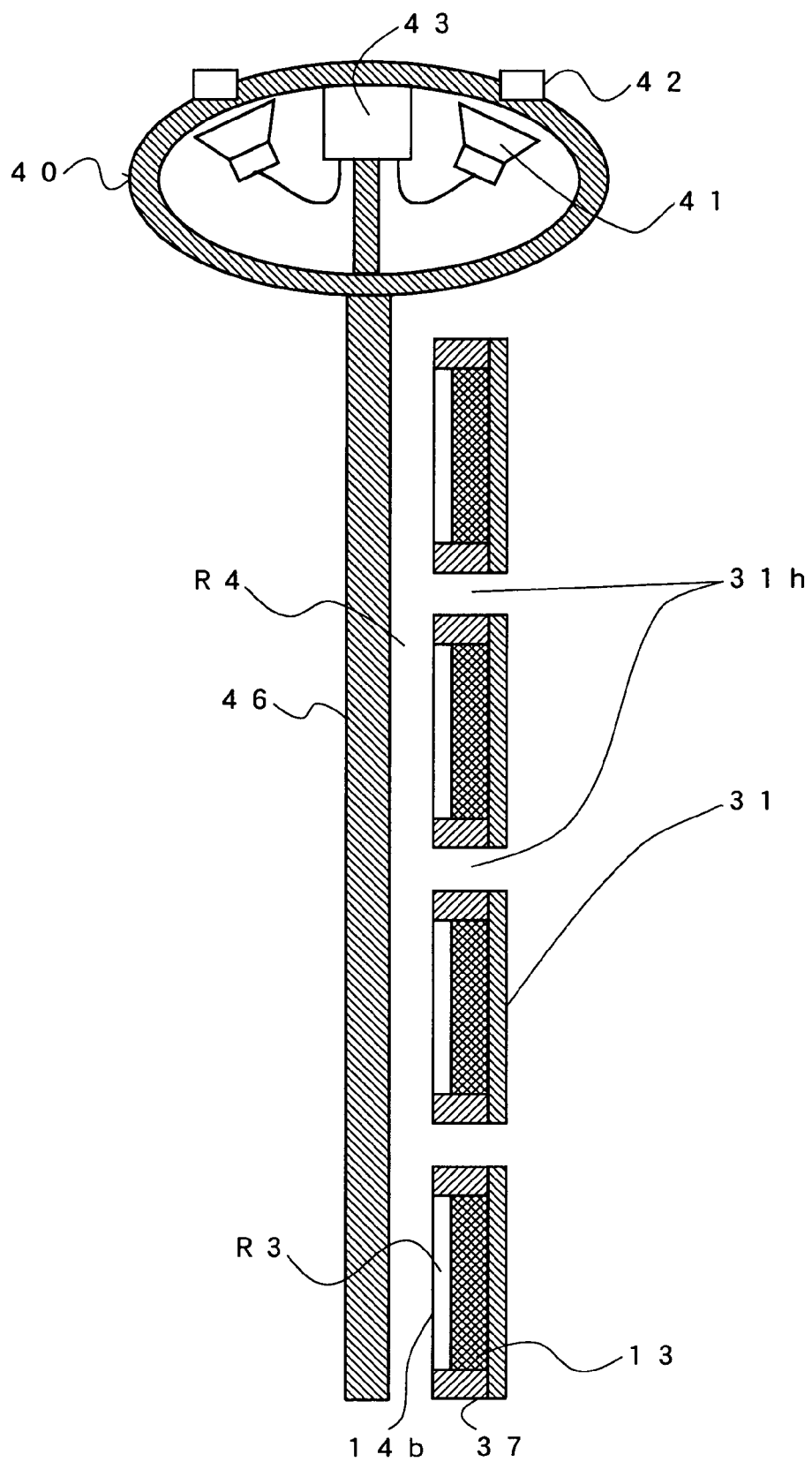
FIG. 16 is a cross-sectional view showing a structure of the sound absorbing structure 4.
Figure 17:
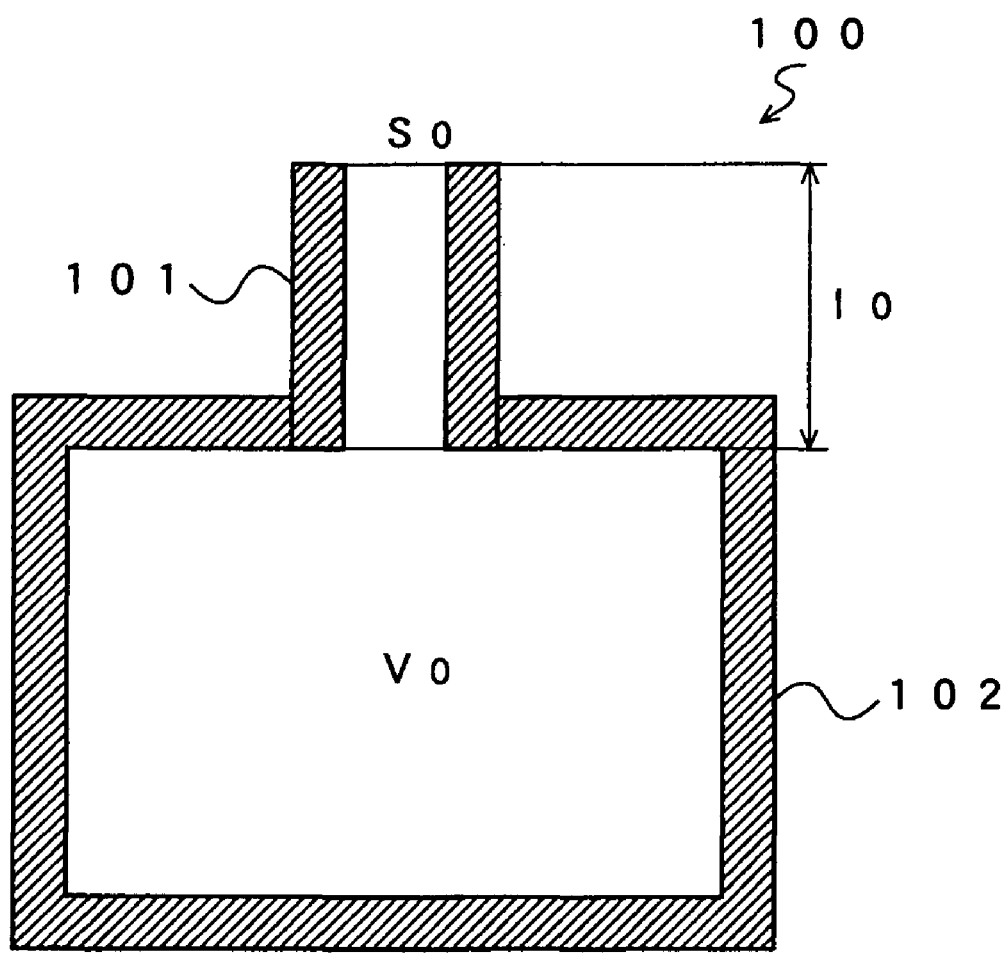
FIG. 17 is a cross-sectional view showing a structure of the conventional sound absorbing structure 100.
Figure 18:
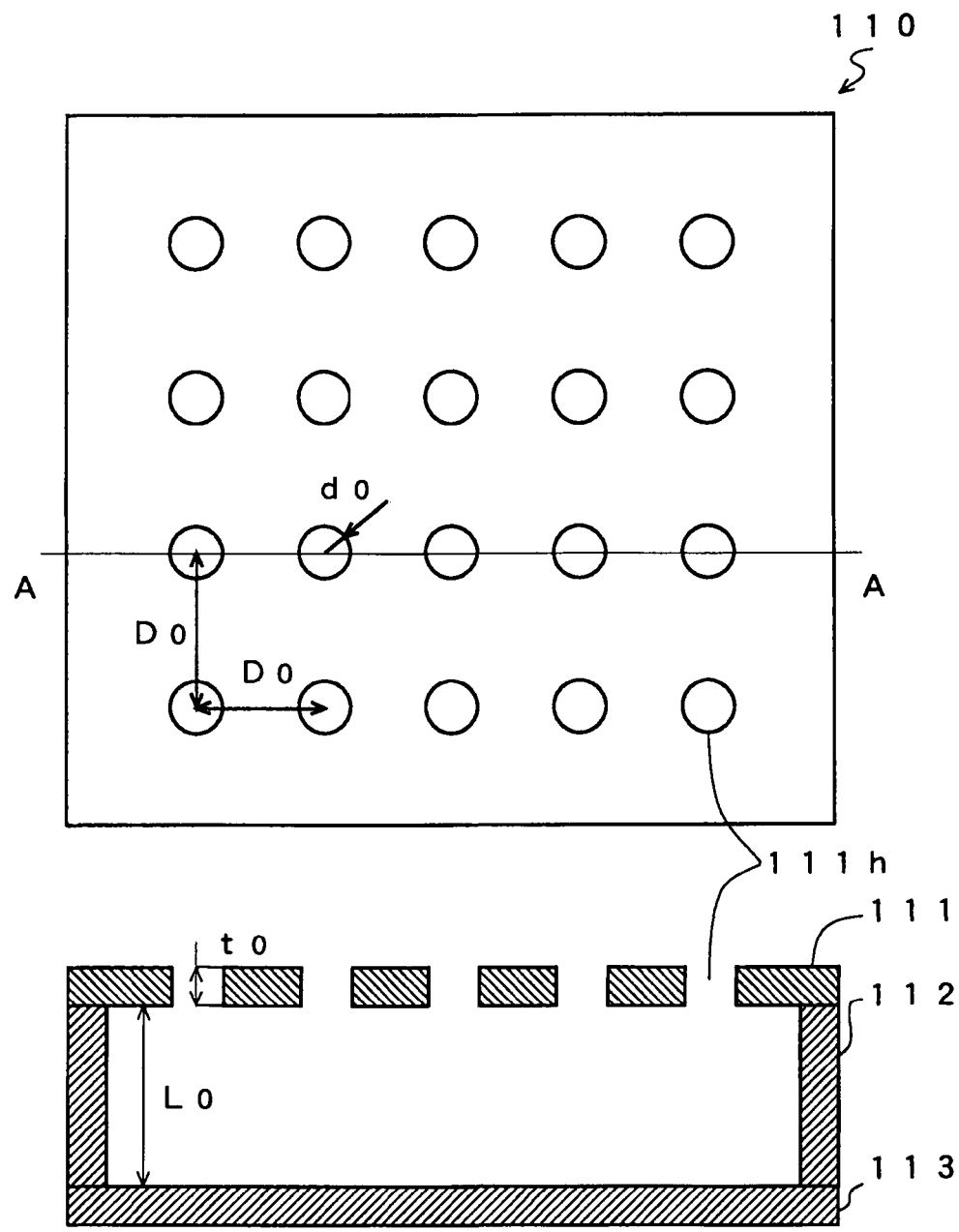
FIG. 18 shows a front view of a conventional sound absorbing structure 110 and a cross-sectional view, taken along a line AA, of the conventional sound absorbing structure 110.

A sound absorbing structure 4 according to a fourth embodiment of the present invention will be described with reference to FIGS. 15 and 16. FIG. 15 shows an example where an active noise control technology is applied to the sound absorbing structure 4 installed as a sound absorbing wall in the vicinity of a noise source such as a road, a railroad, a factory or the like. FIG. 16 is a cross-sectional view showing a structure of the sound absorbing structure 4. The sound absorbing structure 4 comprises the front board 31, the side boards 32, a backboard 46, the partition plates 37, a housing 40, speakers 41, microphones 42, a control circuit 43, a plurality of the gas adsorption materials 13 and a plurality of the shielding elements 14b. The sound absorbing structure 4 according to the present embodiment differs from the above-described sound absorbing structure 3 according to the third embodiment in that the housing 40, the speakers 41, the microphones 42 and the control circuit 43 are provided at the top of the back board 46. Except for this difference, the fourth embodiment is identical to the third embodiment and thus descriptions thereof will be omitted. The plurality of the shielding elements 14b may be any of the above-described shielding elements 14. Hereinafter, a description will be given with a focus on the above-mentioned difference.

The control circuit 43 is fixed inside of the housing 40. The control circuit 43 includes a control circuit for active noise control, and an amplifier. The control circuit 43 performs processing, which is referred to as an active noise control technology. The active noise control technology is a technology for outputting, from a speaker, a sound having an opposite phase to that of a sound such as a noise or the like, so as to negate the sound. The speakers 41 are fixed inside of the housing 40. The speakers 41 each output a sound toward the outside of the housing 40 in accordance with an input from the control circuit 43. In other words, the speakers 41 each output a sound toward an exterior space of the sound absorbing structure 4.

The microphones 42 are fixed on an outer side of the housing 40. The microphones 42 each detect a sound propagated from the outside of the housing 40 to output a signal of the detected sound into the control circuit 43. In other words, the microphones 42 each detect a sound propagated from the exterior space of the sound absorbing structure 4.

The control circuit for active noise control in the control circuit 43 generates signals each having an opposite phase to that of a signal of the sound detected by each of the microphones 42. The generated signals each having the opposite-phase are appropriately amplified by the amplifier in the control circuit 43 to be outputted to the speakers 41. The speakers 41 each output a sound having an opposite phase to that of the sound detected by each of the microphones 42. Accordingly, the sounds detected by the microphones 42, i.e., noise, are canceled by the sounds which are outputted from the speakers 41. Consequently, noise is reduced.

As described above, in the sound absorbing structure 4 according to the present embodiment, an amount of sounds to be absorbed is increased by using the active control technology, as compared with the third embodiment.

In the description above, the front board 31, the side boards 32, the partition plates 37, the plurality of the gas adsorption materials 13 and the plurality of the shielding elements 14b are provided on the right side of the back board 46 in the sound absorbing structure 4. However, the present invention is not limited thereto. For example, these components may be provided on the both sides of the back board 46. Although a structure, in which the front board 31 is divided off by the partition plates 37, has been described, a plurality of the sound absorbing structures 1 as shown in FIG. 1 may be arranged and installed on the back board 46, for example.

A sound absorbing structure according to the present invention realizes both sound absorption in a low-pitched range and a reduction in the size of the structure. The sound absorbing structure is applicable to a sound insulation wall or the like which is installed inside a train, inside a car, inside an airplane, in the vicinity of an airport, along a railroad, or along a road. Also, the sound absorbing structure is applicable to a sound absorbing wall or the like which is installed on a ceiling and a wall in a studio, a factory, or a house.

The invention claimed is:

1. A sound absorbing structure comprising:
 a housing including
  a front face,
  a side face configured perpendicular with respect to at least a part of an edge portion of the front face, and
  at least one opening;
 a gas adsorption material placed in an interior space of said housing, which interior space is delimited by the front face and the side face, said gas adsorption material physically adsorbing gas in the interior space;
 at least one acoustic connection section provided in said opening, said acoustic connection section acoustically connecting the interior space of said housing and an exterior space outside of said housing; and
 a sealing element provided in the interior space of said housing that completely seals said gas adsorption material within an area of the interior space, said sealing element being capable of preventing gas from entering and leaving the area sealed by said sealing element and also being capable of vibrating so as to allow a sound to be transmitted from the exterior space into said housing, wherein said gas adsorption material expands an acoustic equivalent volume within said housing due to its physical adsorption ability, and forms a Helmholtz resonator due to an acoustic mass of air in said acoustic connection section, an acoustic mass of said sealing element, and the acoustic equivalent volume within said housing.

2. The sound absorbing structure according to claim 1, wherein said gas adsorption material is at least one of activated carbon and zeolite.

3. The sound absorbing structure according to claim 1, wherein said gas adsorption material is at least one selected from the group consisting of granular activated carbon, fibrous activated carbon, felt activated carbon and nonwoven-fabric activated carbon.

4. The sound absorbing structure according to claim 1, wherein
   a plurality of the acoustic connection sections are provided in at least one of the front face and the side face, and
   the plurality of the acoustic connection sections function as different acoustic masses from each other.

5. The sound absorbing structure according to claim 1, wherein
   said housing includes the side face configured perpendicular with respect to an entire edge portion of the front face and
   the interior space of said housing is open at a back side of the housing.

6. The sound absorbing structure according to claim 1, wherein said sealing element is a pouch-shaped body in which said gas adsorption material is placed.

7. The sound absorbing structure according to claim 6, wherein the pouch-shaped body is produced from a material containing one selected from the group consisting of silicon dioxide, aluminum and alumina.

8. The sound absorbing structure according to claim 1, wherein said acoustic connection section is structured by an acoustic port.

9. The sound absorbing structure according to claim 1, further comprising a sound absorbing element for absorbing a sound propagated from the exterior space of the housing, which sound absorbing element is placed inside of said housing or on an outer surface of the housing.

10. The sound absorbing structure according to claim 9, wherein the sound absorbing element is at least one selected from the group consisting of glass wool, rock wool, slag wool, felt, resin foam and porous cast iron.

11. The sound absorbing structure according to claim 1, further comprising:
   a microphone for detecting a sound propagated from the exterior space of the housing;
   a sound generation circuit for generating a sound signal having an opposite phase to that of the sound detected by the microphone; and
   a speaker for outputting a sound to the exterior space of the housing, which sound is based on the sound signal generated by the sound generation circuit.

* * * * *